US008015564B1

(12) United States Patent
Beyer et al.

(10) Patent No.: US 8,015,564 B1
(45) Date of Patent: Sep. 6, 2011

(54) METHOD OF DISPATCHING TASKS IN MULTI-PROCESSOR COMPUTING ENVIRONMENT WITH DISPATCHING RULES AND MONITORING OF SYSTEM STATUS

(75) Inventors: Dirk Beyer, Walnut Creek, CA (US); Janet Wiener, Palo Alto, CA (US); Terence Kelly, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1855 days.

(21) Appl. No.: 11/116,687

(22) Filed: Apr. 27, 2005

(51) Int. Cl.
*G06F 9/46* (2006.01)
(52) U.S. Cl. ............... 718/100; 718/102; 718/103
(58) Field of Classification Search .......... 718/102–105
See application file for complete search history.

(56) References Cited

U.S. PATENT DOCUMENTS

| | | | | |
|---|---|---|---|---|
| 5,392,430 | A * | 2/1995 | Chen et al. ............. | 718/102 |
| 5,742,821 | A | 4/1998 | Prasanna | |
| 6,338,072 | B1 * | 1/2002 | Durand et al. ........... | 707/205 |
| 6,434,590 | B1 | 8/2002 | Blelloch et al. | |
| 6,658,650 | B1 * | 12/2003 | Bates ..................... | 717/127 |
| 6,938,048 | B1 * | 8/2005 | Jilk et al. ............... | 1/1 |
| 7,395,536 | B2 * | 7/2008 | Verbeke et al. ......... | 718/100 |
| 2002/0194251 | A1 * | 12/2002 | Richter et al. ......... | 709/105 |
| 2003/0149714 | A1 * | 8/2003 | Casati et al. ........... | 709/100 |
| 2004/0117794 | A1 | 6/2004 | Kundu | |
| 2005/0015437 | A1 * | 1/2005 | Strait .................... | 709/203 |
| 2006/0095912 | A1 * | 5/2006 | Wood-Gaines et al. .... | 718/100 |
| 2006/0232589 | A1 * | 10/2006 | Glein .................... | 345/473 |
| 2008/0216062 | A1 * | 9/2008 | Vasilevskiy et al. ..... | 717/144 |

OTHER PUBLICATIONS

Shouman ("The interactive process between some dispatching mechansims and interrupted machine centers in FMSs", Elsevier Science SA, Journal of Materials Processing Technology, 2000, pp. 466-477.*
Thomas L. Adam et al., A Comparison of List Schedules for Parallel Processing Systems, Communications of the ACM, 1974, 17(12):685-690, ACM Press, New York, NY.
Ishfaq Ahmad et al., Analysis, Evaluation, and Comparison of Algorithms for Scheduling Task Graphs on Parallel Processors, Proceedings of the 1996 2nd International Symposium on Parallel Architectures, Algorithms, and Networks, (I-SPAN'96), 1996, 207-213, IEEE, Piscataway, NJ.
Ishfaq Ahmad et al., Automatic Parallelization and Scheduling of Programs on Multiprocessors using CASCH, Proceedings of the 1997 International Conference on Parallel Processing (ICPP'97), 1997, pp. 288-291, IEEE, Piscataway, NJ.

(Continued)

*Primary Examiner* — Kenneth Tang (57) ABSTRACT

An embodiment of a method of dispatching tasks in a multi-processor computing environment begins with a step of a dispatcher within the multi-processor computing environment receiving job properties for a plurality of jobs to be processed in the multi-processor computing environment. Each job comprises at least one task. In a second step, the dispatcher employs an initial dispatching rule to assign an initial subset of tasks to processors within the multi-processor computing environment. The method continues with a third step of the dispatcher monitoring system status of the multi-processor computing environment. In a fourth step, the dispatcher selects a second dispatching rule from a plurality of dispatching rules in response to a change in the system status. In a fifth step, the dispatcher employs the second dispatching rule to assign a second subset of tasks to the processors.

37 Claims, 3 Drawing Sheets

OTHER PUBLICATIONS

S. Baruah et al., On-line scheduling in the presence of overload, Proceedings of the 32nd Annual Symposium on Foundations of Computer Science, 1991, pp. 100-110, IEEE, Piscataway, NJ.

Peter Brucker, Scheduling Algorithms, 4th Ed., 2004, pp. 1-36, Springer-Verlag, Berlin, Germany.

Maui Cluster Scheduler, 2005, Cluster Resources Inc., Spanish Fork, UT. <http://www.supercluster.org/maui> [viewed on Aug. 19, 2005].

Condor Project Homepage, University of Wisconsin, Madison, WI. <http://www.cs.wisc.edu/condor/> [viewed on Aug. 19, 2005].

Michael L. Dertouzos et al., Multiprocessor On-Line Scheduling of Hard-Real-Time Tasks, IEEE transactions on Software Engineering, 1989, 15(12):1497-1506, IEEE, Piscataway, NJ.

Hesham El-Rewini et al., Task Scheduling in Multiprocessing Systems, Computer, 1995, 28(12):27-37, IEEE, Piscataway, NJ.

Dror G. Feitelson, Job Scheduling in Multiprogrammed Parallel Systems: Extended Version, IBM Research Rpt. RC 19790 (87657), Second Revision, 1997.

Michael Iverson et al., Dynamic, Competitive Scheduling of Multiple DAGs in a Distributed Heterogeneous Environment, 1998, Columbus OH.

Bala Kalyanasundaram et al., Speed is as Powerful as Clairvoyance, 1995, Pittsburgh PA.

Hans Kellerer et al., Knapsack Problems, 2004, pp. 1-42, Springer-Verlag, Berlin, Germany.

Yu-Kwong Kwok et al., Dynamic Critical-Path Scheduling: An effective Technique for Allocating Task Graphs to Multiprocessors, IEEE Transactions on Parallel and Distributed Systems, 1996, 7(5):506-521, IEEE, Piscataway, NJ.

Yu-Kwong Kwok et al., Static Scheduling Algorithms for Allocating Directed Task Graphs to Multiprocessors, ACM Computing Surveys, 1999, 31(4):407-471, ACM Press, New York, NY.

Benjamin S. Macey et al., A Performance Evaluation of CP List Scheduling Heuristics for Communication Intensive Task Graphs, 1998, Nedlands, Australia.

S. J. Noronha et al., Knowledge-Based Approaches for Scheduling Problems: A Survey, IEEE Transactions on Knowledge and Data Engineering, 1991, 3(3):160-171, IEEE, Piscataway, NJ.

Frank Padberg, Applying Process Simulation to Software Project Scheduling, 2003, Karlsruhe, Germany.

Cynthia A. Phillips et al., Optimal Time-Critical Scheduling Via Resource Augmentation (Extended Abstract), 1997, Albuquerque, NM.

Michael Pinedo, Scheduling: Theory, Algorithms, and Systems, Second Edition, 2002, Prentice-Hall, Upper Saddle River, NJ.

Platform LSF: Intelligent, policy-driven batch application workload processing, 2004, Platform Computing, Inc., Markahm, Ontario, Canada.

Jay Sethuraman et al., Optimal Stochastic Scheduling in Multiclass Parallel Queues, Proceedings of the 1999 ACM SIGMETRICS international conference on Measurement and modeling of computer systems, 1999, pp. 93-102, ACM Press, New York, NY.

Jiri Sgall, On-Line Scheduling—A Survey, 1998, Praha, Czech Republic. <http://www.math.cas.czi~sgall/ps/schsurv.ps>.

Simple Linux Utility for Resource Management, Jun. 23, 2005, SLURM Team, Livermore, CA. <http://www.11nl.gov/linux/slurm/slurm.html>.

Yueh-O Wang et al., Hindsight Helps: Deterministic Task Scheduling with Backtracking, 1997, College Station, TX.

Kent Wilken et al., Optimal Instruction Scheduling Using Integer Programming, Proceedings of the ACM SIGPLAN 2000 conference on Programming language design and implementation, pp. 121-133, ACM Press, New York, NY.

Min-You Wu et al., Runtime Parallel Incremental Scheduling of DAGs, Proceedings: 2000 International Conference on Parallel Processing, 2000, pp. 541-548, IEEE, Piscataway, NJ.

John Zahorjan et al., Processor Scheduling in Shared Memory Multiprocessors, Proceedings of the 1990 ACM SIGMETRICS conference on Measurement and modeling of computer systems, 1990, pp. 214-225, ACM Press, New York, NY.

Terence Kelly et al., U.S. Appl. No. 11/069,198, filed Feb. 28, 2005.

Cipriano Santos et al., U.S. Appl. No. 11/069,385, filed Feb. 28, 2005.

Todd Tannenbaum et al, Condor—A Distributed Job Scheduler, Beowulf Cluster Computing with Linux, Thomas Sterling, editor, Oct. 2001, The MIT Press, Cambridge, MA.

\* cited by examiner

| Table 1 | |
|---|---|
| Dispatching Rule | Description |
| Longest Critical Path First (LCPF) | Select the assignable task from the job having the longest critical path $t_{u,j}$ |
| Critical Path Algorithm (CPA) | Select the assignable task that is on critical path to exit node of single precedence DAG of all jobs |
| Random task first (RANDOM) | Select from the assignable tasks at random |
| Job identifier order (FIRST) | Select the assignable task from the job having lowest job identifier number |
| Job priority order (PRIORITY) | Select the assignable task from the job having highest priority |
| Shortest total processing time first (STCPU) | Select the assignable task from the job having the shortest total processing time $T_j$ |
| Shortest critical path first | Select the assignable task from the job having the shortest critical path length $t_{u,j}$ |
| Earliest assigned job first | Select the assignable task from the job that had a task assigned to a processor at an earliest time |
| Latest assigned job first | Select the assignable task from the job that most recently had a task assigned to a processor |
| Unassigned job first | Select the assignable task from a job that has yet to have a task assigned to a processor |
| Job having most remaining processing time first | Select the assignable task from the job having the most remaining processing time |
| Job having least remaining processing time first | Select the assignable task from the job having the least remaining processing time |
| Job having longest total processing time first | Select the assignable task from the job having the longest total processing time |
| Random job first | Select the assignable task from a job selected at random |
| Job having longest remaining critical path first | Select the assignable task from the job having longest remaining critical path first |
| Job having shortest remaining critical path first | Select the assignable task from the job having shortest remaining critical path first |
| Longest task first | Select from the longest assignable task first |

FIG. 5

METHOD OF DISPATCHING TASKS IN MULTI-PROCESSOR COMPUTING ENVIRONMENT WITH DISPATCHING RULES AND MONITORING OF SYSTEM STATUS

FIELD OF THE INVENTION

The present invention relates to the field of computing. More particularly, the present invention relates to the field of computing where tasks are dispatched for execution.

BACKGROUND OF THE INVENTION

Scheduling is a basic research problem in both computer science and operations research. The space of problems is vast. A subset of this problem space is non-preemptive multiprocessor scheduling without processor-sharing. Generally, techniques for solving non-preemptive multi-processor scheduling problems are based upon an objective function, which a scheduling tool seeks to optimize. Such objective functions include, the completion time of the last job (i.e., the makespan) or mean completion time.

In many cases, task dispatching decisions are made manually by human operators. This approach does not scale, is labor intensive, error prone, and often results in undesirable dispatching sequences (e.g., low utilization, uneven load, violated assignment constraints, and violated precedence constraints).

Automated dispatchers are based on fixed dispatching rules such as FIFO (first-in, first-out), round robin, lowest utilization first, and fair share. As a result, automated dispatching sequences are inflexible to system changes. In some cases, automated dispatching rules can be changed by a human operator while a system is in operation. This allows for improved performance but requires human intervention.

SUMMARY OF THE INVENTION

The present invention comprises a method of dispatching tasks in a multi-processor computing environment. According to an embodiment, the method begins with a step of a dispatcher within the multi-processor computing environment receiving job properties for a plurality of jobs to be processed in the multi-processor computing environment. Each job comprises at least one task. In a second step, the dispatcher employs an initial dispatching rule to assign an initial subset of tasks to processors within the multi-processor computing environment. The method continues with a third step of the dispatcher monitoring system status of the multi-processor computing environment. In a fourth step, the dispatcher selects a second dispatching rule from a plurality of dispatching rules in response to a change in the system status. In a fifth step, the dispatcher employs the second dispatching rule to assign a second subset of tasks to the processors.

According to another embodiment, the method begins with a first step of a dispatcher within the multi-processor computing environment receiving job properties for a plurality of jobs to be processed in the multi-processor computing environment. Each job comprises at least one task. The method continues with a second step of the dispatcher employing an initial dispatching rule to assign an initial subset of tasks to processors within the multi-processor computing environment. In a third step, the dispatcher monitors system status of the multi-processor computing environment. The method continues with the dispatcher iteratively performing fourth and fifth steps. In the fourth step, the dispatcher selects a replacement dispatching rule from a plurality of dispatching rules in response to a change in the system status. In the fifth step, the dispatcher employs the replacement dispatching rule to assign a subsequent subset of the tasks to the processors.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 5 provides a table of list scheduling rules employed by embodiments of a method of dispatching tasks within a multi-processor computing environment of the present invention.

DETAILED DESCRIPTION OF A PREFERRED EMBODIMENT

Figure 1:
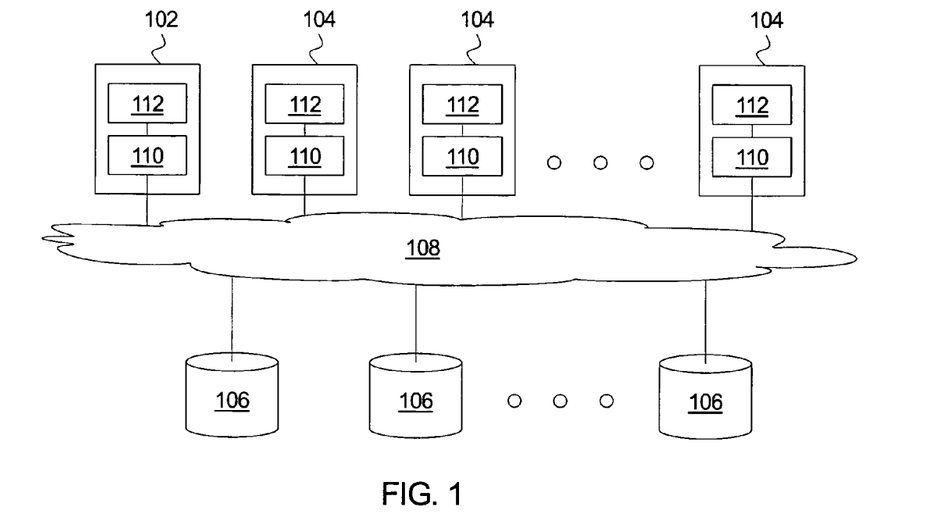
FIG. 1 illustrates a multi-processor computing environment that employs a method of dispatching tasks in accordance with an embodiment of the present invention.

An embodiment of a multi-processor computing environment that employs a method of dispatching tasks of the present invention is schematically illustrated in FIG. 1. The multi-processor computing environment 100 comprises a dispatcher 102, a plurality of servers 104, and storage units 106, which are coupled together by a network 108. In an embodiment, the dispatcher 102 comprises a processor 110 and memory 112. In an embodiment, each server 104 comprises a processor 110 and memory 112. In another embodiment, one or more servers 104 further comprise one or more additional processors. In an alternative embodiment, the dispatcher 102 and the servers 104 are coupled by the network 108 and the storage units 106 are coupled to the dispatcher 102 and the servers 104 by a SAN (storage area network). More generally, a multi-processor computing environment that employs a method of dispatching tasks of the present invention includes a plurality of processors, memory, and storage. In this general multi-processor computing environment, one or more of the processors acts as a dispatcher. The dispatcher is a computing entity that performs a method of dispatching tasks of the present invention.

The multi-processor computing environment 100 processes jobs each of which is made up of one or more tasks. Some or all of the jobs may each include a plurality of tasks and precedence constraints among the plurality of tasks. In an embodiment, each of the jobs includes a series of stages. Each stage includes computational tasks that may be executed in parallel. All tasks in a stage must complete before any tasks in the next stage may begin execution. In other words, the tasks in a later stage are subject to a precedence constraint that requires the preceding stage's tasks finish processing before any of the tasks in the later stage may begin processing. There are no precedence constraints between tasks of different jobs. The processing of the tasks is preferably non-preemptive; once processing of a task begins, it must complete its processing. Alternatively, a task may begin processing, be killed, and then be re-started at its beginning or it may be checkpointed, killed, and restarted from the checkpoint.

Figure 2:
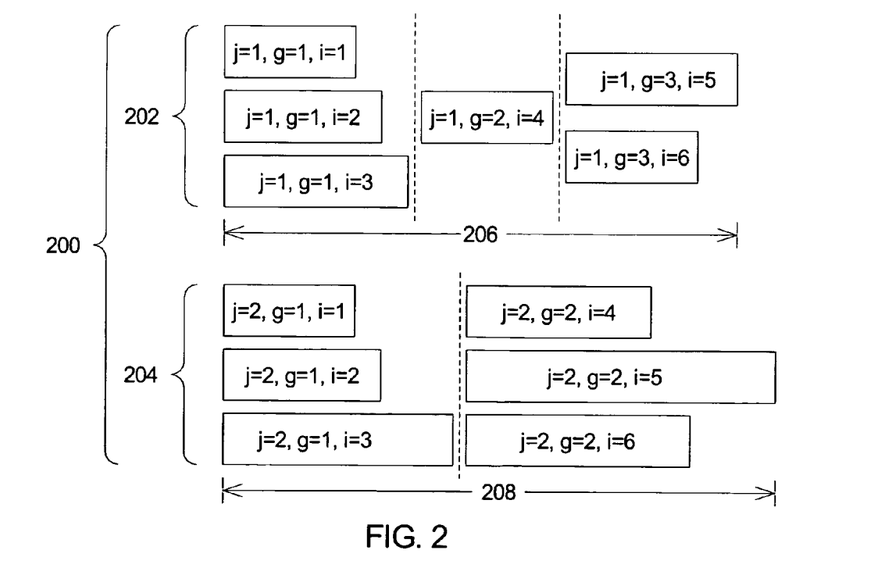
FIG. 2 illustrates a set of multi-stage jobs processed according to a method of dispatching tasks in accordance with an embodiment of the present invention as a task chart.

An embodiment of a set of multi-stage jobs processed according to an embodiment of a method of dispatching tasks of the present invention is illustrated as a task chart in FIG. 2. The set of multi-stage jobs 200 includes first and second jobs, 202 and 204. The first job 202 (also indicated by j=1) includes three stages, indicated by g∈{1, 2, 3}, and six tasks, indicated by i∈{1, 2, ..., 6}. The second job 204 (also indicated by j=2) includes two stages, indicated by g∈{1, 2}, and six tasks, indicated by i∈{1, 2, ..., 6}. The first and second jobs, 202 and 204, may be characterized by first and second critical path lengths, 206 and 208, which are the times required to process the first and second jobs, 202 and 204, respectively, if an unlimited number of processors are available.

Figure 3:
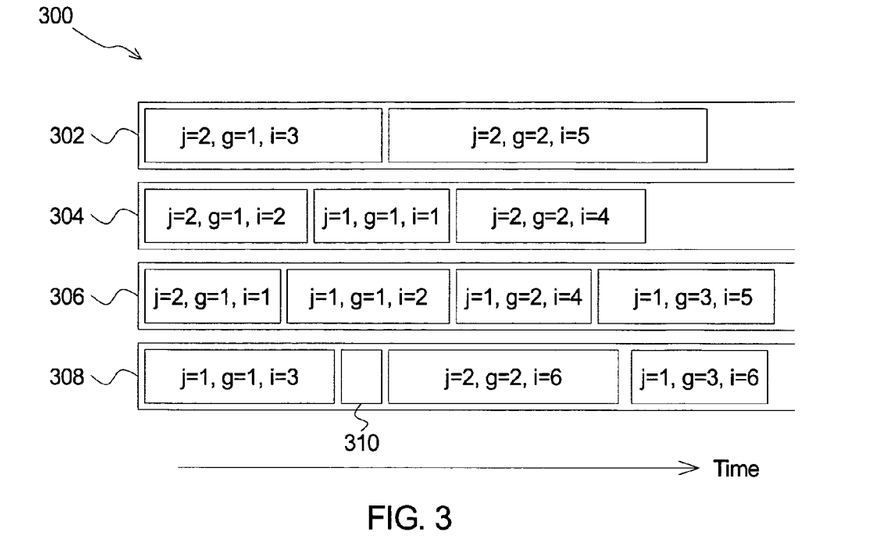
FIG. 3 is an exemplary Gantt chart depicting a schedule for a set of multi-stage computer processing jobs in accordance with an embodiment of the present invention.

Often, a Gantt chart is used to depict a schedule for a set of jobs. A Gantt chart places time on a horizontal axis and processors (or machines or some other unit of processing) along a vertical axis. An exemplary Gantt chart is provided as FIG. 3 and corresponds to an embodiment of a schedule for the set of multi-stage jobs illustrated in FIG. 2. The Gantt chart 300 includes four time-lines for first through fourth processors, 302 ... 308, which process the first and second jobs, 202 and 204 (FIG. 2). The Gantt chart 300 includes only a single idle time period, 310.

The problem of dispatching the multi-stage computing processing jobs may be described more formally as follows. The multi-stage computer processing jobs comprise a set of jobs j∈J. Job j contains a set of stages g∈G(j). A set of tasks i in stage g of job j is denoted as S(g,j). Stages encode precedence constraints among tasks within a job. No task in stage g+1 may begin until all tasks in stage g have completed. Stages represent a special case of "series-parallel" precedence constraints or interval based precedence constraints. Precedence constraints do not exist among tasks of different jobs.

The estimated total processing time $T_j$ of job j is the sum of expected task execution times over all tasks in the job. The estimated total processing time $T_j$ may be given by:

$$T_j = \sum_{\substack{i \in S(g,j) \\ g \in G(j)}} \bar{t}_{i,g,j}$$

where $\bar{t}_{i,g,j}$ is the estimated execution time of task i of stage g of job j. $T_j$ is the minimum expected time to complete job j if it runs on a single processor. By contrast, the estimated critical path length $t_{u,j}$ of job j is the amount of time that is required to complete the job on an unlimited number of processors. The critical path length $t_{u,j}$ may be given by:

$$t_{u,j} = \sum_{g \in G(j)} \max_{i \in S(g,j)} \{\bar{t}_{i,g,j}\}$$

In an embodiment, the multi-stage jobs comprise a batch of animation processing jobs. For example, the batch of animation processing jobs may be brief excerpts of a computer-animated film that is in production. Typically, each of the brief excerpts is processed in a series of stages which must be processed in a particular order. For example, the series of stages may begin with simulation of physical movement followed by model baking, then frame rendering, and concluding with film clip assembly.

Other computer processing jobs have a similar multi-stage structure in which stages include tasks that may be executed in parallel and later stages are subject to precedence constraints that require tasks in an earlier stage to complete processing before the tasks of the later stage may begin processing. Examples include protein sequence matching, certain classes of fast Fourier transform computations, petroleum exploration workloads, and distributed data processing.

More generally, the jobs may include a plurality of tasks in which later tasks are subject to precedence constraints imposed by earlier tasks and in which some tasks may be executed in parallel. Such computer processing jobs may be characterized as a set of DAGs (directed acyclic graphs) in which nodes represent tasks, edges represents precedence constraints, and each DAG represents a computer processing job. Each DAG has an associated critical path length $t_{u,j}$, which is the amount of time that is required to complete the job on an unlimited number of processors.

Figure 4:
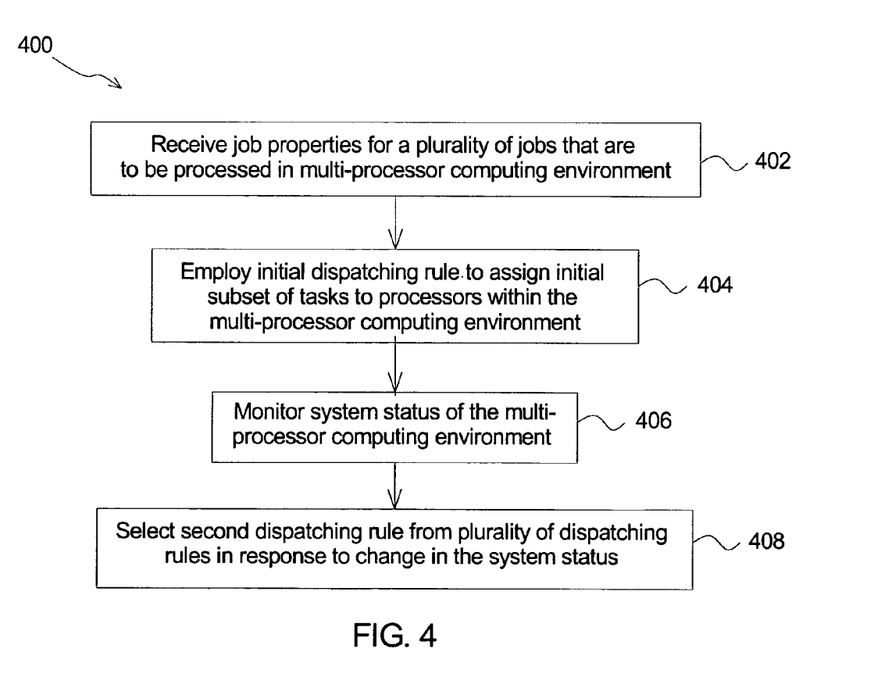
FIG. 4 illustrates a method of dispatching tasks within a multi-processor environment as a flow chart in accordance with an embodiment of the present invention.

An embodiment of a method of dispatching tasks within a multi-processor computing environment of the present invention is illustrated as a flow chart in FIG. 4. In a first step 402, a dispatcher within the multi-processor environment (e.g., the dispatcher 102 within the multi-processor environment 100 of FIG. 1) receives job properties for a plurality of jobs that are to be processed in the multi-processor environment. The job properties may be provided by another computer or a human operator. Each job has at least one task. One or more of the jobs may include a plurality of tasks. Such multi-task jobs may include precedence constraints among the job's tasks. As described above, a precedence constraint is a requirement that an earlier task of a job completes its processing before a later task may begin processing.

The job properties for each job may include an estimated processing time for each of the job's tasks. For each multi-task job, if any, the job properties may further include an estimated critical path length, an estimated total processing time, and precedence constraints among tasks. For each single task job, the estimated processing time for the single task is also the estimated critical path length and the estimated total processing time. The job properties for each job may include a priority such as a high priority, a medium priority, or a low priority. The job properties for each job may include a completion reward. If a job completes by its due time, the completion reward for the job is accrued. If not, the completion reward may be reduced or it might not accrue at all. The job properties for each job may include a user identifier. Such a user identifier may identify an individual, a group, or an organization that submitted the job for processing.

In a second step 404, the dispatcher employs an initial dispatching rule to assign an initial subset of tasks to processors of the multi-processor computing environment (e.g., the processors 110 of the multi-processor computing environment 100 of FIG. 1). In an embodiment, the initial dispatching rule is a list scheduling rule that the dispatcher employs in a list scheduling algorithm. In the list scheduling algorithm, tasks are arranged in a list according to the list scheduling rule. When a processor becomes available, an executable task closest to a head of the list is assigned to the available processor. In another embodiment, the initial dispatching rule may also include one or more ancillary dispatching rules such as imposing a delay under certain circumstances. For example, such a delay may preclude assignment of certain executable tasks to an available processor so that a few remaining non-executable tasks from a particular multi-task job can immediately be assigned to the available processor upon satisfying a precedence constraint. Exemplary list scheduling rules that the dispatcher may employ are listed in Table 1, which is provided as FIG. 5. Dispatching rules other than, or in addition to, list scheduling rules may be employed. For example, if more than one processor is available, a scheduling rule may be used to select from among the available processors for assigning an executable task. Such a rule may select from among idle processors randomly with given relative probabilities of selection.

In a third step 406, the dispatcher monitors a system status of the multi-processor computing environment. The system status includes utilization of processors. The utilization of processors identifies idle processors, if any, and may include additional information such as utilization statistics for the processors. The system status may also include other parameters such as the job properties of remaining jobs to be processed, the job properties of processed jobs, past performance of the multi-processor computing environment, objective functions for system performance, number of jobs being processed, number of jobs to be processed, and number of active processors. Further, the system status may include statistical measures such as frequency distribution of critical path lengths and frequency distribution of completion rewards, each of which may be divided into jobs to be processed, jobs being processed, and completed jobs for a particular processing period.

In an embodiment, the dispatcher performs the third step 406 of monitoring the system status by iteratively determining the system status upon each occurrence of a trigger criterion. For example, the trigger criterion may be selected from a time interval (e.g., a second or a millisecond), a new job arrival, a job completion, a job completion delay, a job properties update, a system status update, or a combination thereof.

In a fourth step 408, the dispatcher selects a second dispatching rule from a plurality of dispatching rules in response to a change in the system status. The plurality of dispatching rules may include one or more of the list scheduling rules listed in Table 1 (FIG. 5). In an embodiment of the fourth step 408, the dispatcher applies a selection rule to the system status, which returns the second dispatching rule. For example, the selection rule may take the form of, "If a particular condition occurs, then switch to the second dispatching rule." The dispatcher may apply the selection rule upon each occurrence of a trigger criterion. In a fifth step 410, the dispatcher employs the second dispatching rule to assign a second subset of tasks to the processors.

In alternative embodiments, the dispatcher detects an incremental change in the system status part way through the second or fourth steps, 404 or 408, and, in response, performs an additional step of adjusting one or more parameters for the initial dispatching rule or the second dispatching rule, respectively. For example, a dispatching rule may pick idle servers at random with given relative probabilities of selection for the servers. Upon detecting that a particular server's utilization is significantly higher than its assigned probability, the dispatcher may reduce the assigned probability to bring the utilization of the particular server down. Once the utilization has been reduced, the dispatcher may increase the assigned probability back to its original value. Or, for example, a dispatching rule may include multiple list scheduling rules which are applied on a probability basis such as a 50% STCPU (shortest total processing time first) and 50% LCPF (longest critical path first). (With a 50/50 probability basis, the dispatcher would alternate between STCPU and LCPF.) STCPU gives an expectation of processing some jobs quickly; LCPF provides an expectation of minimizing the makespan (i.e., the time to complete the last job of a batch of jobs processed over a processing period). A schedule having a minimum makespan (or near minimum makespan) often exhibits a Gantt chart having a near vertical right edge (e.g., FIG. 3). At a point-in-time within a particular instantiation, it may be found that 50% STCPU is not adequately filling a queue for reviewers of completed jobs. In this situation, the dispatcher may adjust the rule to 67% STCPU and 33% LCPF until the queue is raised to an adequate level (e.g., some predetermined level).

In an alternative embodiment, the dispatcher iteratively performs modified fourth and fifth steps. In the modified fourth step, the dispatcher selects a replacement dispatching rule from a plurality of dispatching rules in response to a change in the system status. In the modified fifth step, the dispatcher employs the replacement dispatching rule to assign a subsequent subset of the tasks.

In an embodiment in which the dispatcher iteratively performs the modified fourth and fifth steps, the dispatcher or another computing entity employs machine learning to determine which dispatching rule from a set of dispatching rules provides superior performance for each of a set of system states. The system state may be measured by a vector of system metrics such as number of jobs to be processed, average number of tasks per job, number of available processors, total number of processors, time remaining until due time, average estimated critical path length of jobs to be processed, and other parameters. In an embodiment, a training data set is created using a technique such as simulation or measurement of system performance of each of the dispatching rules for different system states. For example, such a training data set may be created from 20 dispatching rules and 10,000 system states, which produces a training data set of 200,000 system performances. A classifier is then trained using the training data set. Such a classifier, for example, may be a classification tree, a neural network, or a set of selection rules. Data mining packages such as Weka (from U. of Waikato, NZ), Enterprise Miner (from SAS), Clementine (from SPSS), or S-PLUS (from Insightful Corp.) may be used to train the classifier using the training data set. The dispatcher then employs the classifier in the modified fourth step to select the replacement dispatching rule in response to a change in the system status (i.e., a change from a particular system state to another system state).

In an exemplary embodiment, in the second step 404, the dispatcher employs PRIORITY (highest priority task first) as the initial dispatching rule with a goal of processing higher priority jobs before lower priority jobs. Alternatively, the dispatcher employs another dispatching rule for another goal. In the third step 406, the dispatcher monitors remaining processing time until a due time (e.g., a deadline). In the fourth step 408, the dispatcher selects LCPF (longest critical path first) as the second dispatching rule upon the remaining processing time reaching a longest critical path of un-processed jobs plus a buffer time period. The buffer time period may be determined experimentally from past performance, may be correlated to the longest critical path length of the un-processed jobs, and may be correlated to a summation of total processing times for the un-processed jobs. For example, a 15 minute buffer time period may prove adequate if the longest critical path length is 45 minutes while a two hour longest critical path length may need a 35 minute buffer time period. Similarly, as the summation of the total processing times for the un-processed jobs increase, the buffer time period may be increased. In the fifth step 210, the dispatcher employs LCPF with a goal of minimizing the makespan. The combination of PRIORITY as the initial dispatching rule and LCPF as the second dispatching rule gives an expectation of processing more high priority jobs before the due time while also minimizing the makespan.

In another exemplary embodiment, in the second step 404, the dispatcher employs PRIORITY as the initial dispatching rule with a goal of processing higher priority jobs before lower priority jobs. Alternatively, the dispatcher employs another dispatching policy for another goal. In the third step 406, the dispatcher monitors remaining processing time until a due time. In the fourth step 408, the dispatcher selects SCPF (shortest critical path first) as the second dispatching rule upon the remaining processing time reaching a threshold time period. The threshold time period may be selected in a number of ways. For example, the dispatcher may examine a frequency distribution of critical path lengths and select the threshold time period based upon a critical path length of a 20th percentile job measured from the remaining job having the shortest critical path length. In the fifth step 410, the dispatcher employs SCPF with a goal of processing a relatively high number of jobs within the remaining processing time until the due time. The combination of PRIORITY as the initial dispatching rule and SCPF as the second dispatching rule gives an expectation of processing more high priority jobs before the due time while also providing an expectation of processing a significant number of jobs before the due time.

In another exemplary embodiment, in the second step 404, the dispatcher employs PRIORITY as the initial dispatching rule with a goal of processing higher priority jobs before lower priority jobs. Alternatively, the dispatcher employs another dispatching policy for another goal. In the third step 406, the dispatcher monitors allocated processor time for user identifiers that submitted jobs for processing. In the fourth step 408, the dispatcher selects PRIORITY for a specific user identifier upon the allocated processor time for the particular user falling below a lower threshold fraction of total allocated processor time. In the fifth step 410, the dispatcher employs PRIORITY for the specific user identifier until the allocated processor time rises to an upper threshold fraction of the total allocated processor time. The dispatcher may then employ an additional step of returning to PRIORITY as the dispatching rule. The combination of PRIORITY as the initial dispatching rule and PRIORITY for the specific user identifier as the second dispatching rule allows processing of high priority jobs for all user identifiers until a fair share allocation for the particular user falls below the lower threshold and then brings the fair share allocation for the particular user up to the upper threshold.

In another exemplary embodiment, in the second step 404, the dispatcher employs STCPU or SCPF (shortest critical path first) as the initial dispatching rule with a goal of adequately filling a queue for a post-processing activity such as post-processing review of completed jobs. In the third step 406, the dispatcher monitors the number of completed jobs in the queue. In the fourth step 408, the dispatcher selects the longest critical path first rule upon the number of completed jobs in the queue reaching an upper threshold. In the fifth step 410, the dispatcher employs LCPF with a goal of minimizing the makespan. In an embodiment, the dispatcher continues to monitor the queue and, if the number of completed jobs in the queue falls below a lower threshold (i.e., because completed jobs are removed from the queue for the post-processing activity), the dispatcher returns to the initial dispatching rule until the queue rises to the upper threshold.

In yet another exemplary embodiment, the dispatcher employs PRIORITY or some other dispatching rule as the initial rule and monitors multiple parameters and switches among the policies as the state of the system changes. For example, the dispatcher may monitor number of completed priority jobs, remaining processing time until a due time, a post-processing queue, allocated processor times for users that submitted jobs, and number of completed jobs. The dispatcher may then switch among such dispatching rules as PRIORITY, LCPF, STCPU, SCPF, and PRIORITY for a specific user identifier depending upon the system status as processing proceeds over a processing period.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of dispatching tasks in a dispatcher within a multi-processor computing environment comprising the steps of:
   receiving job properties for a plurality of jobs, including multi-task jobs, to be processed in the multi-processor computing environment, each job comprising at least one task, wherein the job properties comprise an estimated processing time for each task, and the job properties for each multi-task job comprise an estimated critical path length, an estimated total processing time, and precedence constraints among tasks;
   employing an initial dispatching rule from a plurality of dispatching rules to assign an initial subset of tasks to processors within the multi-processor computing environment;
   monitoring system status of the multi-processor computing environment;
   selecting a second dispatching rule from the plurality of dispatching rules in response to a change in the system status; and
   employing the second dispatching rule to assign a second subset of tasks to the processors.

2. The method of claim 1 wherein the job properties for each job further comprise a priority.

3. The method of claim 1 wherein the job properties for each job further comprise a completion reward.

4. The method of claim 1 wherein the job properties for each job further comprise a user identifier.

5. The method of claim 4 wherein the user identifier is selected from an individual user, a group of users, and an organization.

6. The method of claim 1 wherein the monitoring of the system status detects an incremental change in the system status and further comprising adjusting one or more parameters for the initial dispatching rule in response to the incremental change.

7. The method of claim 1 wherein the monitoring of the system status detects an incremental change in the system status and further comprising adjusting one or more parameters for the second dispatching rule in response to the incremental change.

8. The method of claim 1 wherein the system status comprises utilization of the processors in the multi-processing computer system.

9. The method of claim 8 wherein the system status further comprises one or more other parameters selected from the job properties of remaining jobs to be processed, the job properties of processed jobs, past performance of the multi-processor computing environment, objective functions for system performance, number of jobs being processed, number of jobs to be processed, number of active processors, frequency distribution of critical path lengths for the jobs being processed, frequency distribution of critical path lengths for the jobs to be processed, frequency distribution of completion rewards for the jobs being processed, and frequency distribution of completion rewards for the jobs to be processed.

10. The method of claim 1 wherein the monitoring of the system status determines the system status upon occurrence of a trigger criterion.

11. The method of claim 10 wherein the trigger criterion is selected from a time interval, a new job arrival, a job completion, a job completion delay, a job properties update, a system status update, and a combination thereof.

12. The method of claim 1 wherein the selecting of the second dispatching rule applies a selection rule to the system status which returns the second dispatching rule.

13. The method of claim 12 wherein the system status reaches a remaining processing time equal to or less than a longest critical path length of remaining jobs plus a buffer time period and the selection rule returns a longest critical path first dispatching rule as the second dispatching rule.

14. The method of claim 13 wherein the initial processing rule selects an executable task with a highest priority first.

15. The method of claim 12 wherein the system status reaches a remaining processing time equal to or less than a threshold time period and the selection rule selects a shortest critical path first dispatching rule as the second dispatching rule.

16. The method of claim 12 wherein the system status reaches a remaining processing time equal to or less than a threshold time period and the selection rule selects a shortest total processing time first dispatching rule as the second dispatching rule.

17. The method of claim 12 wherein the system status includes an allocated processor time for a particular user identifier that falls below a lower threshold fraction of total allocated processor time and the selection rule selects a highest priority executable task associated with the particular user identifier.

18. The method of claim 17 wherein the allocated processor time for the particular user identifier rises above an upper threshold fraction of the total allocated processor time and further comprising the dispatcher selecting the initial dispatching rule for processing of a third subset of the tasks.

19. The method of claim 18 wherein the initial dispatching rule selects an executable task having a highest priority.

20. The method of claim 12 further comprising placing completed jobs in a queue for a post-processing activity.

21. The method of claim 20 wherein the post-processing activity is post-processing review of completed jobs.

22. The method of claim 20 wherein the system status includes the queue reaching an upper threshold and the selection rule selects the second dispatching rule.

23. The method of claim 22 wherein the initial dispatching rule is selected from a shortest processing time first rule, a shortest critical path first rule, and a combination thereof.

24. The method of claim 22 wherein the second dispatching rule is a longest critical path (LCP) first rule.

25. The method of claim 22 further comprising removing the completed jobs from the queue as the completed jobs are directed to the post-processing activity.

26. The method of claim 25 wherein the system status includes the queue reaching a lower threshold and further comprising selecting the initial dispatching rule to assign a third subset of tasks to the processors.

27. The method of claim 12 wherein the selection rule comprise a series of if-then rules.

28. The method of claim 12 wherein the selection rule comprise a decision tree.

29. The method of claim 1 further comprising selecting a third dispatching rule from the plurality of dispatching rules in response to a further change in the system status.

30. The method of claim 1 further comprising the dispatcher selecting the initial dispatching rule from the plurality of dispatching rules.

31. The method of claim 30 wherein the selecting of the initial dispatching rule applies a selection rule to an initial system status which returns the initial dispatching rule.

32. A method of dispatching tasks in a dispatcher within a multi-processor computing environment comprising the steps of:
receiving job properties for a plurality of jobs to be processed in the multi-processor computing environment, each job comprising at least one task;
employing an initial dispatching rule to assign an initial subset of tasks to processors within the multi-processor computing environment;
monitoring system status of the multi-processor computing environment, wherein the monitoring of the system status determines the system status upon occurrence of a trigger criterion selected from a time interval, a new job arrival, a job completion, a job completion delay, a job properties update, a system status update, and a combination thereof; and
iteratively:
selecting a replacement dispatching rule from a plurality of dispatching rules in response to a change in the system status; and
employing the replacement dispatching rule to assign a subsequent subset of the tasks to the processors.

33. The method of claim 32 wherein the receiving of the job properties for the plurality of jobs occurs over a time period that overlaps a processing time period.

34. The method of claim 32 further comprising employing machine learning to determine a correlation of system states to dispatching rules.

35. The method of claim 34 wherein the selecting of the replacement dispatching rule occurs when the system status correlates with one of the system states for a non-current dispatching rule.

36. A non-transitory computer readable medium comprising computer code for dispatching tasks in a dispatcher within a multi-processor computing environment, with executable routines to:
receive job properties for a plurality of jobs, including multi-task jobs, to be processed in the multi-processor computing environment, each job comprising at least one task, wherein the job properties comprise for each task an estimated processing time, and the job properties comprise for each multi-task job an estimated critical path length, an estimated total processing time, and precedence constraints among tasks;
employ an initial dispatching rule to assign an initial subset of tasks to processors within the multi-processor computing environment;
monitor system status of the multi-processor computing environment;
select a second dispatching rule from a plurality of dispatching rules in response to a change in the system status; and
employ the second dispatching rule to assign a second subset of tasks to the processors.

37. A non-transitory computer readable medium comprising computer code for dispatching tasks in a dispatcher within a multi-processor computing environment with executable routines to:

receive job properties for a plurality of jobs to be processed in the multi-processor computing environment, each job comprising at least one task;

employ an initial dispatching rule to assign an initial subset of tasks to processors within the multi-processor computing environment;

monitor system status of the multi-processor computing environment to determine the system status upon occurrence of a trigger criterion selected from a time interval, a new job arrival, a job completion, a job completion delay, a job properties update, a system status update, and a combination thereof; and iteratively:
    select a replacement dispatching rule from a plurality of dispatching rules in response to a change in the system status; and
    employ the replacement dispatching rule to assign a subsequent subset of the tasks to the processors.

* * * * *